Patented June 6, 1950

2,510,146

UNITED STATES PATENT OFFICE 2,510,146

PROCESS FOR AGING FLOUR

Maurice L. Silver, Chicago, Ill.

No Drawing. Application February 10, 1948,
Serial No. 7,512

5 Claims. (Cl. 99—232)

(Granted under the act of March 3, 1883, as
amended April 30, 1928; 370 O. G. 757)

The invention described herein may be manufactured and used by or for the Government for governmental purposes, without payment to me of any royalty therein.

In accordance with the present invention there are provided certain improvements in the treatment of flour, and other cereal products used in baking, for improving baking qualities thereof.

It is customary in the art to treat flour with chemical or physical agents which are intended to produce in newly-milled flour and cereal products the effects of natural aging. These effects are noted in the baking qualities of wheat flour and other cereal products and they are produced most commonly by oxidizing substances usually gases, for example, nitrogen trichloride, chlorine, hypochlorous acid, or oxides of nitrogen, although occasionally bromates, phosphates, sulphates, or persulphates, may be added to the cereal product. In addition to the oxidizing action of these materials on the flour, they exert a bleaching action thereon, thus improving its appearance, as well as baking qualities, and sterilize the flour.

Usually the method most widely used, and which has come to be regarded as an essential for treating flour from winter wheat so as to assure optimum baking qualities, is the nitrogen trichloride process. The process comprises, generally, blowing nitrogen trichloride gas or nitrogen, the trichloride mixed with air or inert gases, into intimate contact with all particles of the flour being treated.

There are certain objections, however, to this process, since while the treatment of flour with nitrogen chloride is said to improve the baking qualities of the dough, a certain amount of the nitrogen trichloride gas will be occluded, inevitably, in the flour, and be carried over into the dough and encased in the finished baked products, and there is definite toxicity present in such products, although the quantities present are so small that the toxic effects are not noticeable, generally.

Thus, animal feeding experiments, employing a wide variety of animals including dogs, cats, rabbits, rats, and monkeys, have shown definitely that nitrogen trichloride-treated flour has a markedly deleterious effect. Depending upon the species involved, the ingestion of such flour produces convulsions, ataxia, weakness, or tremor, and, in general, causes disturbances in brain metabolism that can be recorded with the electroencephalograph. This instrument, which records the pattern, frequency and amplitude of the electrical potentials generated by the brain of man or animal, may demonstrate an alteration of normal brain function before clinical evidence of abnormality is forthcoming. By means of this instrument, as well as by the usual biological techniques, it is clear that the ingestion of flour, cereal products or other food protein, if these have been treated with certain levels of nitrogen trichloride, are toxic to animals in the manner above described.

Consideration of the adverse biological effects of the nitrogen trichloride treatment of foodstuffs makes the development of a biologically-safe maturing agent a most necessary and important contribution to the art of flour improvement. These considerations have led to a careful study of the subject and a series of experiments which have resulted in the present discovery that, if flour is treated with monochloramine and/or dichloramine in the form of a gas, the flour becomes exceptionally well suited to baking purposes without possessing biological toxicity.

From the foregoing, it will be apparent that one object of the present invention is to provide a process for treating flour in which the advantages of aged flour in enhancing the properties of baked goods is present, while eliminating the use of any treating material that is toxic in any degree.

A further object of the invention is to provide a readily operated process for treating flour with treating materials that are non-toxic in character and inexpensive to produce.

A still further object of the invention is to provide a process of the above-indicated character which imparts advantageous properties to wheat flour and similar cereal products, equal to the properties possessed by standard flours, but which is characterized as being entirely free from materials having any toxic properties.

Further objects and advantages of the present invention will become apparent as the description proceeds and the features of novelty will be pointed out in particularity in the appended claims.

As has been indicated above, the invention involves the treatment of the flour with a chloramine gas, which may be either monochloramine or dichloramine, or a desired mixture of these two materials, which materials are non-toxic, and which require only a fraction of the amount of chlorine used in the nitrogen trichloride treatment (about one-third).

In carrying out the process of the present invention, a process of treating flour has been devised which comprises subjecting flour to an atmosphere of gaseous monochloramine or dichloramine, or mono- and di-chloramine and air or an inert gas, in any form of apparatus permitting intimate contact between the particles of flour and the molecules of gas. The air may be either dry or moist and the mixture of monochloramine ($NH_2Cl$) and air, or dichloramine ($NHCl_2$), or mono- and dichloramine and air may be either dry or moist, although excessive moisture, sufficient to increase the water content appreciably, and thereby the adhesive and cohesive forces of flour particles, obviously should be avoided.

Methods of producing monochloramine or dichloramine, or mixtures thereof, are well known in the art. In essence, when chlorine gas or hypochlorous acid or hypochlorite ion (—OCl) is reacted with a solution of an ammonium salt, buffered with appropriate buffers, namely, acetates, phosphates, or borates, all of which are resistant to the action of chlorine, and under proper conditions of alkalinity, that is, with pH greater than 8.5, monochloramine is produced exclusively.

The preferred method employed in connection with the present process is to pass chlorine gas directly into a solution of ammonium chloride containing sufficient borate buffer (sodium borate in potassium chloride) to maintain proper conditions of alkalinity. The gases formed are driven off by forcing air, or inert gas, through the liquid, which carries off the gases for use in the flour-maturing chambers or agitators. The latter are common to many types of flour maturing and bleaching equipment and need not be described in detail. All that is required is to bring monochloramine gas into intimate contact with the flour for a period of from four to ten minutes.

Various modifications of this procedure will effect the desired result. For example, chlorine gas can be poured into a chamber containing calcium carbonate (for the purpose of neutralization of the hydrochloric acid formed) and a solution of ammonium hydroxide of proper strength may be mixed continuously with the correct amount of borate buffer and reacted with the chlorine. The gases formed are driven over the flour in the usual fashion.

As a further modification, air and ammonia gas may be passed in an upward stream through a column packed with surface-increasing materials against a downward stream of a solution of sodium hypochloride, to which buffers may be added to maintain a proper condition of alkalinity.

In addition to the above, the reactions may be effected by electrolytic dissociation. Thus, a direct electrical current (3 amperes, 6 volts) may be passed between two or more carbon electrodes wherein the positive pole has twice the diameter of the negative pole, in a solution containing proper amounts of sodium chloride and ammonium phosphate and where continuous control of the hydrogen ion concentration may be secured. The gases formed are driven off in the usual fashion, and, as in the cases cited above, the fluid may be drained off or recycled through the reaction chamber.

In all of these methods and modifications, the "proper conditions of alkalinity" is understood to mean a pH of substantially 9.0. In general, monochloramine is formed at any pH greater than 8.5, but a pH of 9 is preferred. If the pH is permitted to fall to as low a value as 4.5, dichloramine is formed in increasing amounts, and the gaseous reaction products will contain monochloramine and dichloramine in various proportions. The possibility of operating in the pH zone between 8.5 and 4.5 is indicated, so that should drastic overloading with chlorine occur, or should the buffer reserves be depleted suddenly, the gases produced would be available for use providing that the pH of the reacting solution does not fall below pH 4.5. Another feature of this range of operational pH is that a control operator or mechanism will have a sufficient time to make the changes necessary to ensure proper conditions for the production of monochloramine.

The amount of chlorine required in the above process is a fraction of that required for the nitrogen trichloride process. The quantities of monochloramine, or mono- and dichloramine, or dichloramine itself, necessary for the maturation of the flour, depend on the character and grade of the flour. For a potent flour, it may not require more than one pound of monochloramine to mature 88,000 pounds of flour, while for a clear flour this amount of gas would mature possibly about 30,000 pounds of flour. Nevertheless, on the basis of chlorine consumption, the present process is more economical than the nitrogen trichloride process. Furthermore, the amounts of monochloramine or dichloramine used on flour may be doubled, tripled, or multiplied indefinitely, without producing detectable adverse effects on the physiology of an organism ingesting such flour, or stimulating pathological processes therein.

From the foregoing it will be understood that the invention is not limited necessarily to the specific procedural steps herein described, nor to the precise gas composition, it being found that the concentrations of monochloramine and dichloramine may vary between 0 per cent and 100 per cent for either of these gases, and in the presence or absence of air. It will be understood, therefore, that it is intended and desired to embrace within the scope of this invention such modifications and changes as may be necessary to adapt it to varying conditions and uses, as defined by the appended claims.

What is claimed is:

1. The method of treating finely comminuted cereal products for effecting aging thereof, which comprises intimately contacting the product to be treated to a gaseous chloramine-containing atmosphere selected from the group consisting of monochloramine and dichloramine and any mixtures thereof.

2. The method of treating wheat flour for effecting aging thereof, which comprises passing a gaseous atmosphere containing a chloramine gas selected from the group consisting of monochloramine and dichloramine through the flour in intimate contact therewith.

3. The method of treating wheat flour for effecting aging thereof, which comprises passing a gaseous atmosphere consisting of air and a chloramine gas selected from the group consisting of monochloramine and dichloramine through the flour in intimate contact therewith until the flour becomes matured.

4. The method of maturing wheat flour for effecting aging thereof, which comprises contacting intimately with the flour a chloramine gas-containing atmosphere comprising a gas selected from the group consisting of monochloramine and dichloramine, maintaining the contact between the flour and atmosphere for a time range of from approximately four minutes to approximately ten minutes.

5. The method of maturing wheat flour for effecting aging thereof, which comprises intimately commingling the flour with a gaseous atmosphere containing monochloramine until the flour is aged.

MAURICE L. SILVER.

REFERENCES CITED

The following references are of record in the file of this patent:

UNITED STATES PATENTS

| Number | Name | Date |
| --- | --- | --- |
| 1,330,937 | Fegan | Feb. 17, 1920 |
| 2,087,544 | Penn | July 20, 1932 |

FOREIGN PATENTS

| Number | Country | Date |
| --- | --- | --- |
| 345,985 | Great Britain | Acc. Mar. 30, 1931 |

OTHER REFERENCES

Gregory, Uses and Applications of Chemicals and Related Materials, vol. II, 1944, Reinhold Pub. Corp., N. Y., pages 249, 250.